Oct. 22, 1946.  F. H. COMEY  2,409,666
BEAD CLAMP FOR PNEUMATIC TIRES
Filed Aug. 29, 1942
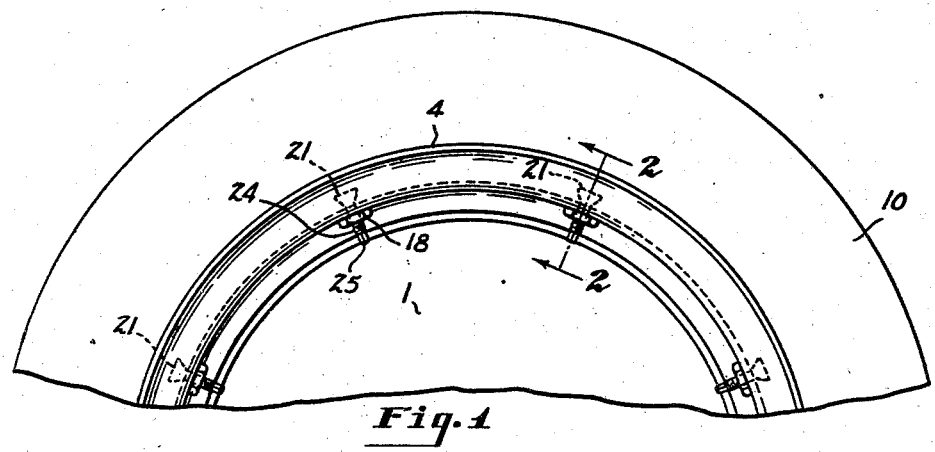
Fig. 1
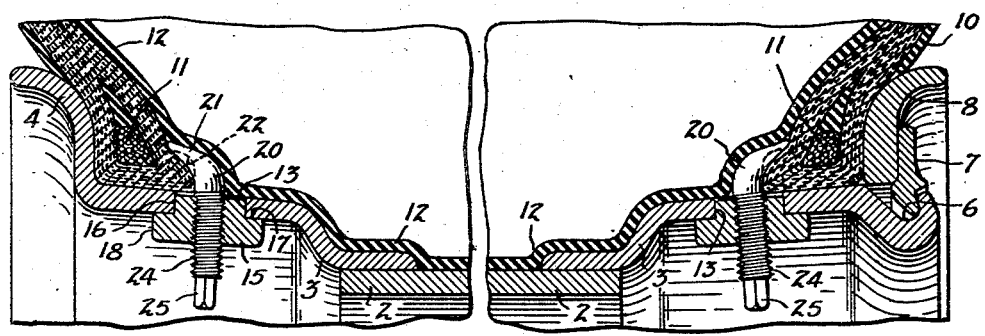
Fig. 2
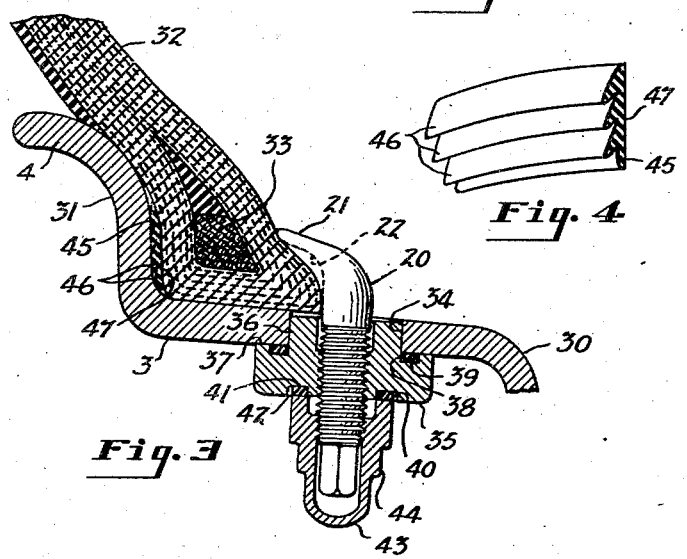
Fig. 3
Fig. 4
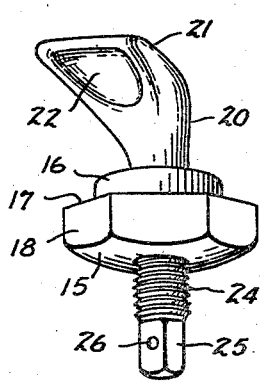
Fig. 5
INVENTOR
Fred H. Comey
BY
Evans + McCoy
ATTORNEYS Patented Oct. 22, 1946

2,409,666

UNITED STATES PATENT OFFICE 2,409,666

BEAD CLAMP FOR PNEUMATIC TIRES

Fred H. Comey, Akron, Ohio, assignor to The General Tire & Rubber Company, Akron, Ohio, a corporation of Ohio Application August 29, 1942, Serial No. 456,659

3 Claims. (Cl. 152—399)

This invention relates to an improved tire bead clamp for clamping the bead firmly against the axially inner face of a tire rim flange.

In the past, pneumatic tires generally have been secured upon rims of wheels on which they were mounted by inflation pressure that forced inextensible tire beads against the axially inner face of the bead flange part of the rim of the wheel on which the tire was mounted to prevent circumferential slipping of the tire casing on its rim.

The primary objects of the present invention are to provide a simple and effective means for positively clamping the beads of the tire casing to the wheel rim and to provide a tire and wheel assembly of greater safety than has heretofore been provided.

With the above and other objects in view, which will be apparent to those familiar with the art to which the present invention pertains, illustrative embodiments of the present invention are shown in the accompanying drawing, wherein:

Figure 1 is a fragmentary elevational view of a wheel and tire assembly with the improved tire bead clamp installed thereon;

Fig. 2 is an enlarged and fragmentary foreshortened axial section of the assembly that is shown in Fig. 1 taken along the line 2—2 of Fig. 1, with an inner tube inside of the tire casing;

Fig. 3 is an enlarged and fragmentary axial section of a modified tire, rim and tire bead clamp assembly, wherein no inner tube is used in the tire casing;

Fig. 4 is a fragmentary perspective view of the finned strip that comprises a part of the assembly shown in Fig. 3; and Fig. 5 is an enlarged perspective view of the tire bead clamp per se, shown in Fig. 1.

The tire bead clamp which forms the subject matter of the present invention is shown in the accompanying drawing as installed on an axially wide rimmed wheel. A wheel disc 1 carries an axially directed flange 2 at its radially outer edge to which the tire carrying rim 3 is secured. Along one of its axial edges the rim 3 has a tire retaining flange 4 and, along its other axial edge, a depressed slot 6 in which a ring 7 is seated to secure a tire retaining flange 8 in place.

A wide tire casing 10 is mounted on the rim of the wheel with its bead portions 11 seated against the respective bead flanges 4 and 8 of the rim. The tire casing 10 has an inner tube 12.

The wheel rim has a plurality of round apertures 13 spaced from each other a desired distance circumferentially of the wheel rim and positioned adjacent the toe portions of the casing beads 11. A bead clamp comprising a threaded lug 20 and a clamping nut 15 is mounted in each of the apertures 13. The clamping nut 15 has a cylindrical portion 16 that makes close rotating fit within its aperture 13 and has a seating land 17 that engages the radially inner face of the rim 3. The clamping nut 15 also has a wrench land 18 or the like for turning the nut in the rim 3. The nut 15 is threaded internally over a portion of the bore for the reception of the clamping lug 20 that extends through the rim 3.

The lug 20 has a flared end 21 that is disposed within the tire casing 10 and that overhangs and engages the toe portion of the tire casing bead 11. The flared end 21 of the lug 20 is preferably cupped at 22 to improve its grip on the toe portion of the tire casing bead 11. The lug 20 has an elongated body portion 25 that is threaded at 24 for engaging the threaded interior of the nut 15. Suitable wrench engaging means, such as the lands 25 or the like, are provided for holding the lug 20 in proper position against rotation while the clamping nut is drawn up. A suitable indicating means, such as a punch mark 26 or the like, serves to indicate the position of the flared end 21 of the lug 20 from outside of the wheel and tire assembly so that the position of the flared end relative to the bead 4 is clearly indicated.

The tire 10 is mounted on the rim 3 in the usual manner and the removable flange 8 secured in place with the ring 7. The tire 10 is then inflated sufficiently to press the tire beads 11 in place against the rim flanges 4 and 8. The inner tube is then deflated and the lugs 20, with the clamping nuts 15 mounted thereon, are inserted through the apertures 13. The lugs 20 are then turned so that the flared ends 21 of the lugs 20 overlie the toes of the tire beads 11. The nuts 15 are then tightened on the lugs 20 while the lugs are held in their proper position until the tire beads 11 are firmly clamped against the rim flanges 4 and 8. The inner tube is then inflated and the tire is ready for use.

A modified assembly is shown in Fig. 3 of the accompanying drawing for use where no inner tube is employed in the tire casing. In this construction a drop center rim 30 has a bead flange 31 extending along each of its axial edges. The rim 30 carries a tire casing 32, with its beads 33 disposed adjacent to the rim flanges 31 and engaged by the flanged ends 21 of the lugs 20, as shown, to secure the tire casing 32 on the rim 30. As in the first embodiment, the circumferentially spaced apertures 34 in the rim 30 are positioned adjacent to the toes of the tire beads 33 and each rim aperture houses a clamping nut 35 that is rotatably disposed therein. A cylindrical portion 36 of each nut 35 closely fits in the rim aperture 34 and a rim contacting face 37 of each of the nuts 35 is positioned for engagement with the radially inner face of the rim 30. A groove 38 is interposed between the cylindrical portion 36 and the rim contacting face 37 of the nut 35 to seal the nut with the face of the rim. The groove 38 houses a packing ring 39 that is compressed within the groove 38 against the radially inner face of the rim 30 to maintain an air seal therebetween. The face of the nut 35 that is remote from the rim 30 has a groove 40 that contains a packing ring 41 for sealing the lug 20 within a cap 43 that is threaded on the lug after the lug is tightened up. The cap 43 is turned by the use of a wrench on the cap wrench lands 44.

The tire casing 32 is caused to maintain air sealing engagement with the wheel rim 30 in any desired way. Preferably a strip 45 of compressible rubber is used for this purpose. The strip 45 preferably has a plurality of longitudinally extending fins 46 on one side and a substantially flat side 47 on the opposite side thereof. The smooth face 47 of the strip 45 is cemented to the axially outer face of the tire bead 33. This strip 45 is thus interposed between the outer bead face and the axially inner face of the rim flange 31 in air sealing engagement with both. The fins 46 of the strip 45 engage the rim flange 31 and preferably extend toward any possible air channel leading out of the high air pressure compartment within the interior of the tire. The valve stem, not shown, for inflating the tire 32, is mounted in the wheel rim 30 in air-sealing engagement therewith. For this construction, the tire 32 is mounted on the rim 30 and the tire beads 33 worked over against the rim flanges 31 by the use of a tool inserted through the rim apertures 34. The lugs 20, with the nuts 35 mounted thereon, are then positioned in the rim apertures 34 and secured in place in the manner heretofore described. The caps 43 are then threaded on the exposed ends of the lugs 20 and turned tightly against the cap seal packing 41 to insure an air tight seal between the nut 35 and the cap 43. The tire casing 32 may then be inflated and the tire is ready for use.

The clamping of the tire beads to the rim is particularly useful where the tire casing is subjected to severe braking as in aircraft applications, or where there is danger of throwing a deflated casing as in military operations.

It is to be understood that the particular contours of the lugs, nuts, caps and air sealing strip that are disclosed herein, are presented for the purposes of illustration and explanation of the present invention and that modifications may be made therein without departing from the invention as defined in the appended claims.

What I claim is:

1. The combination with a pneumatic tire casing provided with beads and a rim having circular apertures overlapping portions of the bead seating face of the rim, of a bead securing lug having a threaded shank portion and an offset bead clamping toe portion insertable through one of said apertures, and a nut threaded to receive the threaded shank portion of said clamping lug and having a cylindrical part rotatively fitting in one of said apertures and a shoulder of larger diameter than said cylindrical part for bearing against the radially inner rim surface around said aperture and having wrench-engaging surfaces by means of which said nut may be turned to tighten said lug against the bead of the tire.

2. The combination with a wheel rim having a tire retaining flange, a substantially cylindrical bead seating portion adjacent the flange and a circular opening in said bead seating portion spaced inwardly from said flange, of a tire having a bead bearing against said flange and provided with a toe portion partially overlying said opening, a lug having a threaded stem, a wrench engaging portion at one end and a laterally inclined flared head portion at its opposite end for engagement with the toe portion of the tire, said head portion being insertable through said opening, and a nut adapted to be screwed on said stem, said nut having a cylindrical portion fitting in said opening and a larger wrench receiving portion engageable with the interior of the rim.

3. The combination with a wheel rim having a tire retaining flange, a substantially cylindrical bead seating portion adjacent the flange and a circular opening in said bead seating portion spaced inwardly from said flange, of a tire having a bead bearing against said flange and provided with a toe portion partially overlying said opening, a lug having a threaded stem, a wrench engaging portion at one end and a laterally inclined flared head portion at its opposite end for engagement with the toe portion of the tire, said head portion being insertable through said opening, a nut adapted to be screwed on said stem, said nut having a cylindrical portion fitting in said opening and an outer wrench receiving portion larger than the opening, a sealing washer interposed between the larger portion of the nut and the rim, a cap screwed on the stem and engaging the nut, and a sealing washer interposed between the cap and nut.

FRED H. COMEY.